(12) United States Patent
White

(10) Patent No.: US 6,349,910 B1
(45) Date of Patent: Feb. 26, 2002

(54) TOOLBOX MOUNTING BRACKET FOR A PICKUP TRUCK

(76) Inventor: Paul B. White, 13032 Hwy. #79, Hannibal, MO (US) 63401

( * ) Notice: Subject to any disclaimer, the term of this patent is extended or adjusted under 35 U.S.C. 154(b) by 0 days.

(21) Appl. No.: 09/540,509

(22) Filed: Mar. 31, 2000

(51) Int. Cl.[7] .............................................. A47B 96/06
(52) U.S. Cl. ........................... 248/231.61; 248/220.21; 248/220.22
(58) Field of Search ...................... 248/231.61, 231.85, 248/220.21, 220.22

(56) References Cited

U.S. PATENT DOCUMENTS

| | | | | |
|---|---|---|---|---|
| 2,549,753 A | * | 4/1951 | Ashman | 108/45 |
| 4,527,827 A | * | 7/1985 | Maniscalco et al. | 224/405 |
| 4,685,646 A | * | 8/1987 | Harrison | 248/231.61 |
| 5,584,521 A | * | 12/1996 | Hathaway et al. | 296/36 |
| D389,450 S | * | 1/1998 | Wilson | D12/223 |
| 6,196,602 B1 | * | 3/2001 | Esplin | 296/3 |
| 6,203,086 B1 | * | 3/2001 | Dirks et al. | 296/37.6 |

* cited by examiner

*Primary Examiner*—Anita King
*Assistant Examiner*—Holly N. Sy

(57) ABSTRACT

A toolbox mounting bracket for a pickup truck for securing a toolbox in the box of a pickup truck without having to drill holes in the side wall. The toolbox mounting bracket for a pickup truck includes a bracket member including a plate-like member having a front side and a back side and also including a support member being securely attached to the front side of the plate-like member and extending outwardly therefrom; and also includes a truck box fastening member being fastenably threaded through the support member and being adapted to fasten to a truck box for securing the bracket member to the truck box; and further includes a toolbox clamping member being threaded through the support member and being adapted to engage a portion of a toolbox between the toolbox clamping member and the truck box.

16 Claims, 2 Drawing Sheets

TOOLBOX MOUNTING BRACKET FOR A PICKUP TRUCK

BACKGROUND OF THE INVENTION

1. Field of the Invention

The present invention relates to a toolbox clamp and more particularly pertains to a new toolbox mounting bracket for a pickup truck for securing a toolbox in the box of a pickup truck without having to drill holes in the side wall.

2. Description of the Prior Art

The use of a toolbox clamp is known in the prior art. More specifically, a toolbox clamp heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,310,238; 5,121,960; 5,692,791; U.S. Pat. No. Des. 339,782; U.S. Pat. Nos. 5,560,576; and 5,275,458.

While these devices fulfill their respective, particular objectives and requirements, the aforementioned patents do not disclose a new toolbox mounting bracket for a pickup truck. The inventive device includes a bracket member including a plate-like member having a front side and a back side and also including a support member being securely attached to the front side of the plate-like member and extending outwardly therefrom; and also includes a truck box fastening member being fastenably threaded through the support member and being adapted to fasten to a truck box for securing the bracket member to the truck box; and further includes a toolbox clamping member being threaded through the support member and being adapted to engage a portion of a toolbox between the toolbox clamping member and the truck box.

In these respects, the toolbox mounting bracket for a pickup truck according to the present invention substantially departs from the conventional concepts and designs of the prior art, and in so doing provides an apparatus primarily developed for the purpose of securing a toolbox in the box of a pickup truck without having to drill holes in the side wall.

SUMMARY OF THE INVENTION

In view of the foregoing disadvantages inherent in the known types of toolbox clamp now present in the prior art, the present invention provides a new toolbox mounting bracket for a pickup truck construction wherein the same can be utilized for securing a toolbox in the box of a pickup truck without having to drill holes in the side wall.

The general purpose of the present invention, which will be described subsequently in greater detail, is to provide a new toolbox mounting bracket for a pickup truck which has many of the advantages of the toolbox clamp mentioned heretofore and many novel features that result in a new toolbox mounting bracket for a pickup truck which is not anticipated, rendered obvious, suggested, or even implied by any of the prior art toolbox clamp, either alone or in any combination thereof.

To attain this, the present invention generally comprises a bracket member including a plate-like member having a front side and a back side and also including a support member being securely attached to the front side of the plate-like member and extending outwardly therefrom; and also includes a truck box fastening member being fastenably threaded through the support member and being adapted to fasten to a truck box for securing the bracket member to the truck box; and further includes a toolbox clamping member being threaded through the support member and being adapted to engage a portion of a toolbox between the toolbox clamping member and the truck box.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new toolbox mounting bracket for a pickup truck which has many of the advantages of the toolbox clamp mentioned heretofore and many novel features that result in a new toolbox mounting bracket for a pickup truck which is not anticipated, rendered obvious, suggested, or even implied by any of the prior art toolbox clamp, either alone or in any combination thereof.

It is another object of the present invention to provide a new toolbox mounting bracket for a pickup truck which may be easily and efficiently manufactured and marketed.

It is a further object of the present invention to provide a new toolbox mounting bracket for a pickup truck which is of a durable and reliable construction.

An even further object of the present invention is to provide a new toolbox mounting bracket for a pickup truck which is susceptible of a low cost of manufacture with regard to both materials and labor, and which accordingly is then susceptible of low prices of sale to the consuming public, thereby making such toolbox mounting bracket for a pickup truck economically available to the buying public.

Still yet another object of the present invention is to provide a new toolbox mounting bracket for a pickup truck which provides in the apparatuses and methods of the prior art some of the advantages thereof, while simultaneously overcoming some of the disadvantages normally associated therewith.

Still another object of the present invention is to provide a new toolbox mounting bracket for a pickup truck for securing a toolbox in the box of a pickup truck without having to drill holes in the side wall.

Yet another object of the present invention is to provide a new toolbox mounting bracket for a pickup truck which includes a bracket member including a plate-like member having a front side and a back side and also including a support member being securely attached to the front side of the plate-like member and extending outwardly therefrom; and also includes a truck box fastening member being fastenably threaded through the support member and being adapted to fasten to a truck box for securing the bracket member to the truck box; and further includes a toolbox clamping member being threaded through the support member and being adapted to engage a portion of a toolbox between the toolbox clamping member and the truck box.

Still yet another object of the present invention is to provide a new toolbox mounting bracket for a pickup truck that prevents a persons from damaging one's own pickup in order to carry and secure a toolbox.

Even still another object of the present invention is to provide a new toolbox mounting bracket for a pickup truck that is easy and convenient to install in the box of a pickup truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
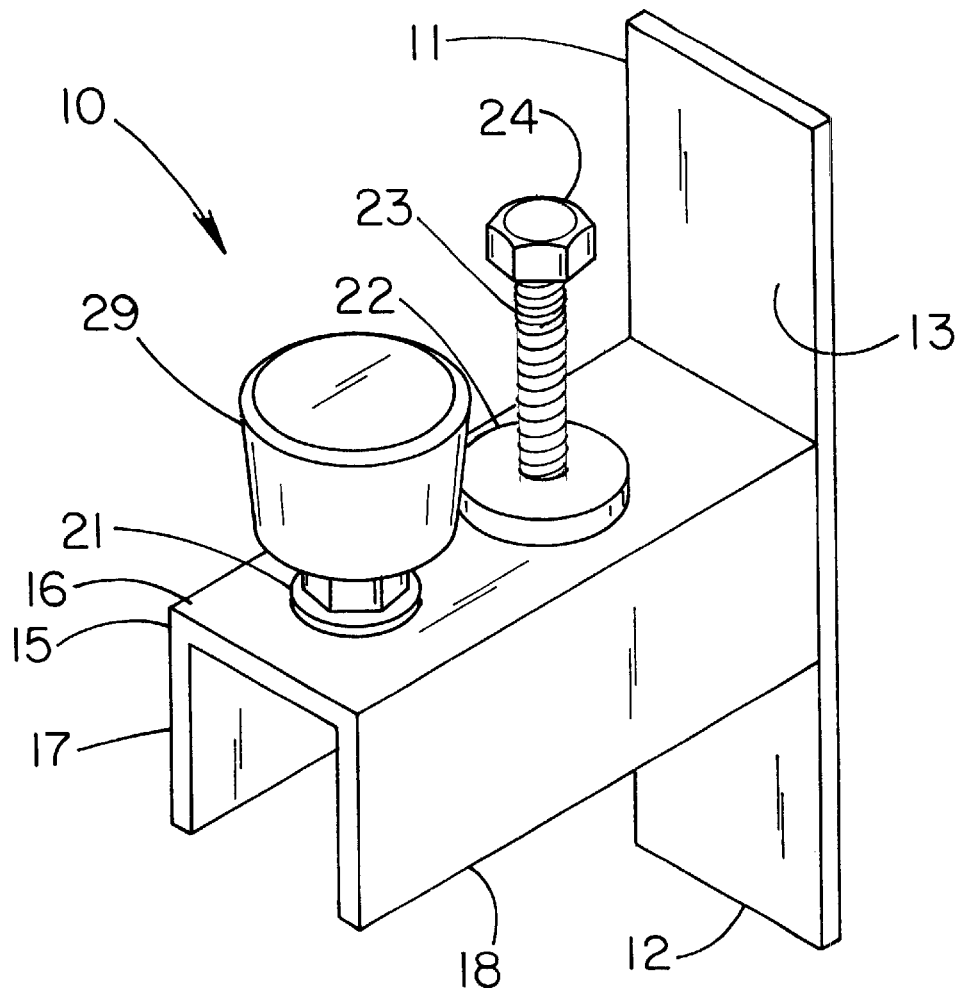
FIG. 1 is a perspective view of a new toolbox mounting bracket for a pickup truck according to the present invention.
Figure 2:
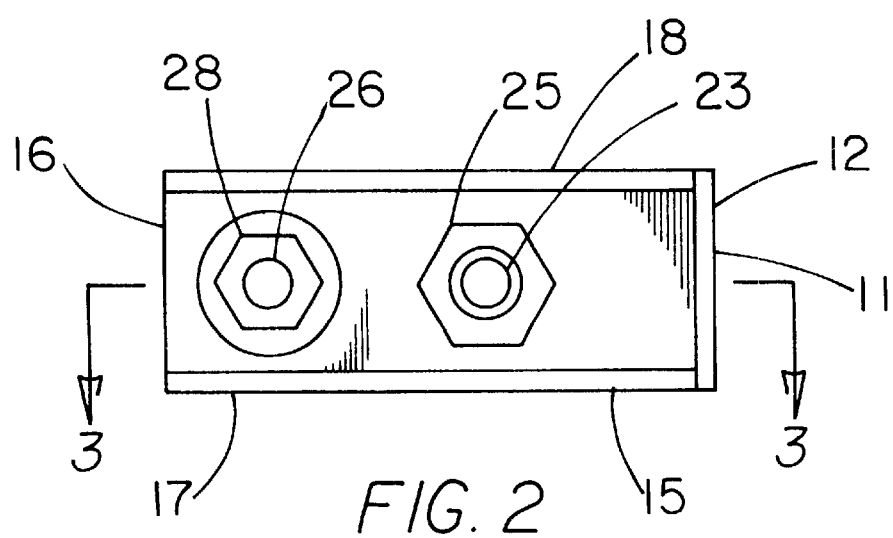
FIG. 2 is a bottom plan view of the present invention.
Figure 3:
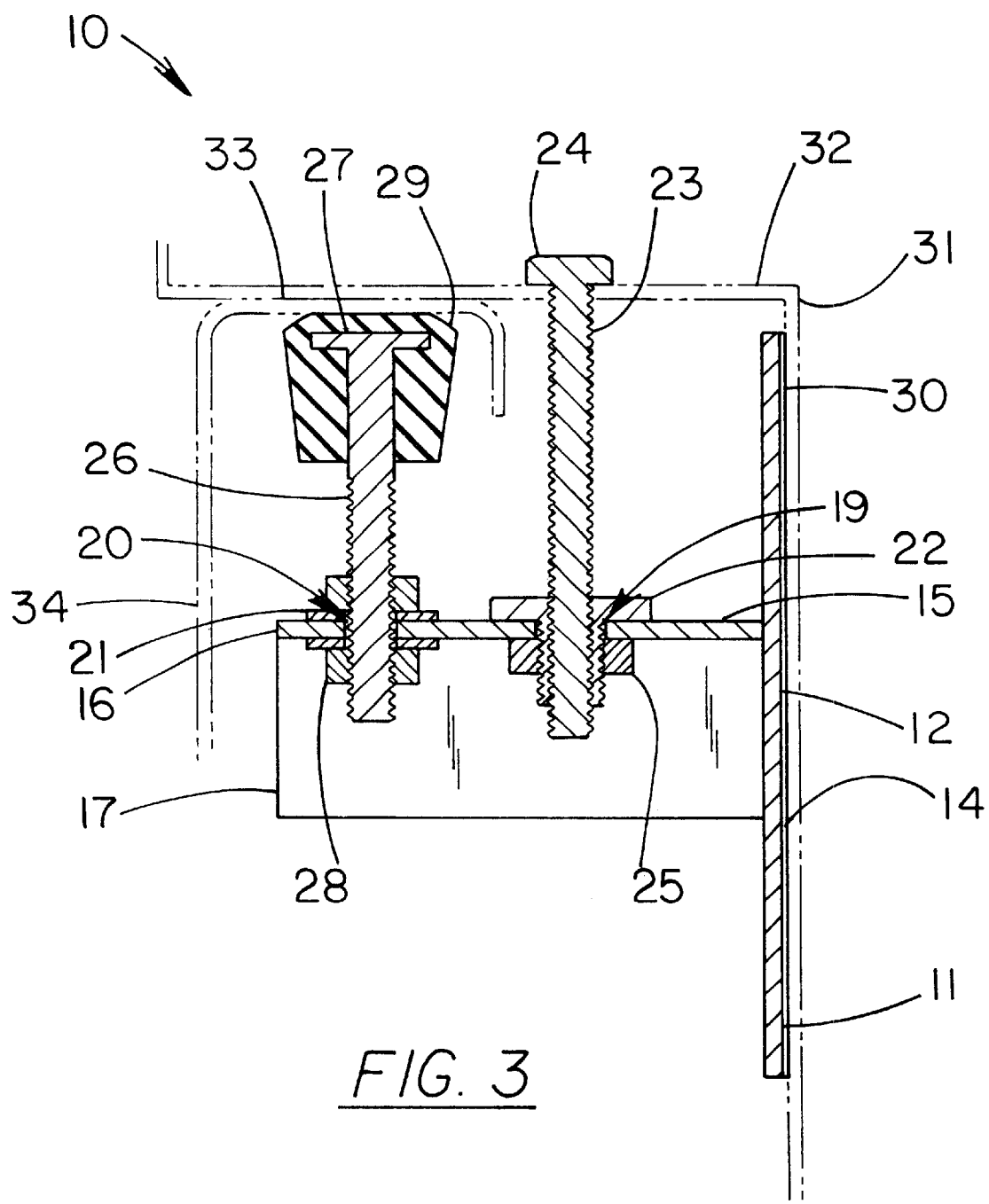
FIG. 3 is a side cross-sectional view of the present invention in use.

With reference now to the drawings, and in particular to FIGS. 1 through 3 thereof, a new toolbox mounting bracket for a pickup truck embodying the principles and concepts of the present invention and generally designated by the reference numeral 10 will be described.

As best illustrated in FIGS. 1 through 3, the toolbox mounting bracket for a pickup truck 10 generally comprises a bracket member 11 including a plate-like member 12 having a front side 13 and a back side 14, and also including a support member 15 being securely and conventionally attached and welded to the front side 13 of the plate-like member 12 and extending outwardly therefrom. The plate-like member 12 is adapted to rest against a side wall 31 of the truck box 32 below a top ledge 33 thereof with the back side 14 of the plate-like member 12 being adapted to essentially face the side wall 31 of the truck box 32. The support member 15 includes a main wall 16 extending generally perpendicular to the plate-like member 12 and having first 19 and second 20 holes spaced apart and extending therethrough, and also including a plurality of brace members 17, 18 securely and conventionally attached to side edges of the main wall 16 and extending downwardly therefrom and being securely and conventionally attached to the plate-like member 12 for supporting and bracing the main wall 16. The first hole 19 is disposed between the second hole 20 and the plate-like member 12. The bracket member 11 further includes a plurality of boss members 21, 22 each of which includes a bore extending therethrough and each of which is securely and conventionally attached and welded to the main wall 16 of the support member 15 and each of which is disposed upon a respective hole 19, 20 with the bore being in alignment with a respective hole 19, 20. The bracket member 11 further includes a protective member 30 securely attached to and covering the back side 14 of the plate-like member 12 to essentially prevent damage to the side wall 31 of the truck box 32. A truck box fastening member is fastenably threaded through the support member and is adapted to fasten to a truck box 32 for securing the bracket member 11 to the truck box 32. The truck box fastening member includes a first elongate threaded member 23 having a head portion 24, and also includes a first threaded fastener 25 which is threaded onto the first elongate threaded member 23 for fastening the first elongate threaded member 23 to the support member 15 with the first elongate threaded member 23 being threaded through one of the boss members 22 and the first hole 19. A toolbox clamping member is threaded through the support member 15 and is adapted to engage a portion of a toolbox 34 between the toolbox clamping member and the truck box 32. The toolbox clamping member includes a second elongate threaded member 26 having a head portion 27, and also including a second threaded fastener 28 which is threaded onto the second elongate threaded member 26 for fastening the second elongate threaded member 26 to the support member 15, and further including a protective bumper-like cover member 29 which is securely and conventionally mounted about the head portion 27 of the second elongate threaded fastener 26 for preventing damage to the toolbox 32. The second elongate threaded member 26 is threaded through one of the boss members 20 and the second hole 20 with the protective bumper-like cover member 29 being essentially made of rubber.

In use, the user places the back side 14 of the plate-like member 12 against the inner side of the side wall 31 of a pickup truck box 32 just below the top ledge 33 and extends the first elongate threaded member 23 through a hole in the top ledge 33 and through the first hole 19 in the support member 15 and fastens the first elongate threaded member 23 to the support member 15 using the first fastening member 25. The user then extends a portion of the toolbox 34 under the top ledge 33 between the top ledge 33 and the second elongate threaded member 26 and engages the portion of the toolbox 34 between the second elongate threaded member 26 and top ledge 33 of the truck box 32 to secure the toolbox 34 inside the truck box 32.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A toolbox mounting bracket for mounting to a truck box of a pickup truck, comprising:
   a bracket member including a plate member having a front side and a back side, and also including a support member being securely attached to said front side of said plate member and extending outwardly therefrom;
   a truck box fastening member being fastenably threaded through said support member and being adapted to fasten to a truck box for securing said bracket member to the truck box;
   a toolbox clamping member being threaded through said support member and being adapted to engage a portion of a toolbox between said toolbox clamping member and the truck box;
   wherein said plate member is adapted to rest against a side wall of the truck box below a top ledge thereof with said back side of said plate member being adapted to essentially face the side wall of the truck box; and
   wherein said support member includes a main wall extending generally perpendicular to said plate member and having a first hole and second hole spaced apart and extending therethrough, and also includes a plurality of brace members securely attached to side edges of said main wall and extending downwardly therefrom and being securely attached to said plate member for supporting and bracing said main wall.

2. A toolbox mounting bracket for mounting to a truck box of a pickup truck as described in claim 1, wherein said first hole is disposed between said second hole and said plate member.

3. A toolbox mounting bracket for mounting to a truck box of a pickup truck as described in claim 1, wherein said bracket member further includes a plurality of boss members each of which includes a bore extending therethrough and each of which is securely attached to said main wall of said support member and each of which is disposed upon a respective one of said first hole and said second hole with said bore being in alignment with a respective said hole.

4. A toolbox mounting bracket for mounting to a truck box of a pickup truck as described in claim 3, wherein said truck box fastening member includes a first elongate threaded member having a head portion, and also includes a first threaded fastener which is threaded onto said first elongate threaded member for fastening said first elongate threaded member to said support member, said first elongate threaded member being threaded through one of said plurality of boss members and said first hole.

5. A toolbox mounting bracket for mounting to a truck box of a pickup truck as described in claim 3, wherein said toolbox clamping member includes a second elongate threaded member having a head portion, and also includes a second threaded fastener which is threaded onto said second elongate threaded member for fastening said second elongate threaded member to said support member, and further includes a protective cover member which is securely mounted about said head portion of said second elongate threaded fastener for preventing damage to the toolbox, said second elongate threaded member being threaded through one of said plurality of boss members and said second hole.

6. A toolbox mounting bracket for mounting to a truck box of a pickup truck as described in claim 1, wherein said bracket member further includes a protective member securely attached to and covering said back side of said plate member for essentially preventing damage to the side wall of the truck box.

7. A toolbox mounting bracket for mounting to a truck box of a pickup truck as described in claim 6, wherein said protective cover member is essentially made of rubber.

8. A toolbox mounting bracket for mounting to a truck box of a pickup truck, comprising:
   a bracket member including a plate member having a front side and a back side, and also including a support member being securely attached to said front side of said plate member and extending outwardly therefrom, said plate member being adapted to rest against a side wall of the truck box below a top ledge thereof with said back side of said plate member being adapted to essentially face the side wall of the truck box, said support member including a main wall extending generally perpendicular to said plate member and having a first hole and a second hole spaced apart and extending therethrough, and also including a plurality of brace members securely attached to side edges of said main wall and extending downwardly therefrom and being securely attached to said plate member for supporting and bracing said main wall, said first hole being disposed between said second hole and said plate member, said bracket member further including a plurality of boss members each of which includes a bore extending therethrough and each of which is securely attached to said main wall of said support member and each of which is disposed upon and being in alignment with a respective one of said first hole and said second hole, said bracket member further including a protective member securely attached to and covering said back side of said plate member to essentially prevent damage to the side wall of the truck box;
   a truck box fastening member being fastenably threaded through said support member and being adapted to fasten to the truck box for securing said bracket member to the truck box, said truck box fastening member including a first elongate threaded member having a head portion, and also including a first threaded fastener which is threaded onto said first elongate threaded member for fastening said first elongate threaded member to said support member, said first elongate threaded member being threaded through one of said plurality of boss members and said first hole; and
   a toolbox clamping member being threaded through said support member and being adapted to engage a portion of a toolbox between said toolbox clamping member and the truck box, said toolbox clamping member including a second elongate threaded member having a head portion, and also including a second threaded fastener which is threaded onto said second elongate threaded member for fastening said second elongate threaded member to said support member, and further including a protective cover member which is securely mounted about said head portion of said second elongate threaded fastener for preventing damage to the toolbox, said second elongate threaded member being threaded through one of said plurality of boss members and said second hole, said protective cover member being essentially made of rubber.

9. A toolbox mounting bracket for mounting to a truck box of a pickup truck, comprising:

a bracket member including a plate member having a front side and a back side, and also including a support member being securely attached to said front side of said plate member and extending outwardly therefrom;

a truck box fastening member being fastenably threaded through said support member and being adapted to fasten to a truck box for securing said bracket member to the truck box;

a toolbox clamping member being threaded through said support member and being adapted to engage a portion of a toolbox between said toolbox clamping member and the truck box; and wherein said support member includes a main wall extending generally perpendicular to said plate member and having a first hole and second hole spaced apart and extending therethrough, and also includes a plurality of brace members securely attached to side edges of said main wall and extending downwardly therefrom and being securely attached to said plate member for supporting and bracing said main wall.

10. A toolbox mounting bracket for mounting to a truck box of a pickup truck as described in claim 9, wherein said plate member is adapted to rest against a side wall of the truck box below a top ledge thereof with said back side of said plate member being adapted to essentially face the side wall of the truck box.

11. A toolbox mounting bracket for mounting to a truck box of a pickup truck as described in claim 9, wherein said first hole is disposed between said second hole and said plate member.

12. A toolbox mounting bracket for mounting to a truck box of a pickup truck as described in claim 9, wherein said bracket member further includes a plurality of boss members each of which includes a bore extending therethrough and each of which is securely attached to said main wall of said support member and each of which is disposed upon a respective one of said first hole and said second hole with said bore being in alignment with a respective said hole.

13. A toolbox mounting bracket for mounting to a truck box of a pickup truck as described in claim 12, wherein said truck box fastening member includes a first elongate threaded member having a head portion, and also includes a first threaded fastener which is threaded onto said first elongate threaded member for fastening said first elongate threaded member to said support member, said first elongate threaded member being threaded through one of said plurality of boss members and said first hole.

14. A toolbox mounting bracket for mounting to a truck box of a pickup truck as described in claim 12, wherein said toolbox clamping member includes a second elongate threaded member having a head portion, and also includes a second threaded fastener which is threaded onto said second elongate threaded member for fastening said second elongate threaded member to said support member, and further includes a protective cover member which is securely mounted about said head portion of said second elongate threaded fastener for preventing damage to the toolbox, said second elongate threaded member being threaded through one of said plurality of boss members and said second hole.

15. A toolbox mounting bracket for mounting to a truck box of a pickup truck as described in claim 9, wherein said bracket member further includes a protective member securely attached to and covering said back side of said plate member for essentially preventing damage to the side wall of the truck box.

16. A toolbox mounting bracket for mounting to a truck box of a pickup truck as described in claim 9, wherein said protective cover member is essentially made of rubber.

\* \* \* \* \*